United States Patent [19]

Gregorious et al.

[11] Patent Number: 4,570,842
[45] Date of Patent: Feb. 18, 1986

[54] CONDUIT WELD POSITIONER WITH ARC LENGTH ADJUSTOR

[75] Inventors: David J. Gregorious, Canaseraga; Roger F. Wilcox, Hornell; Roland R. Burr, Dalton, all of N.Y.

[73] Assignee: Foster Wheeler Energy Corporation, Livingston, N.J.

[21] Appl. No.: 581,628

[22] Filed: Feb. 21, 1984

[51] Int. Cl.⁴ .............................................. B23K 37/04
[52] U.S. Cl. ..................................... 228/48; 228/49.3; 269/37
[58] Field of Search .................... 228/48, 49.3; 269/37, 269/43, 45, 119

[56] References Cited

U.S. PATENT DOCUMENTS

| | | | |
|---|---|---|---|
| 3,239,209 | 3/1966 | Kucka | 269/55 |
| 3,618,845 | 11/1971 | Totten | 228/44 |
| 3,711,920 | 1/1973 | Simmons | 269/45 X |
| 3,772,753 | 11/1973 | Sargeant | 228/48 X |
| 3,827,126 | 8/1974 | Shiozawa et al. | 269/45 X |
| 3,925,854 | 12/1975 | McFadden | 24/81 PE |
| 3,944,202 | 3/1976 | Dearman | 269/130 |

FOREIGN PATENT DOCUMENTS

| | | | |
|---|---|---|---|
| 562405 | 6/1977 | U.S.S.R. | 228/48 |
| 627941 | 10/1978 | U.S.S.R. | 228/48 |

*Primary Examiner*—Robert P. Olszewski
*Attorney, Agent, or Firm*—Marvin A. Naigur; John E. Wilson; Warren B. Kice

[57] ABSTRACT

A conduit weld positioner for positioning two conduit portions extending at an angle to each other in which one of the conduit portions is grasped by a frame tiltably mounted relative to a turntable adapted to rotate about a central axis. The degree of tilting is adjustable in proportion to the angular relationship between the two conduit portions.

6 Claims, 2 Drawing Figures

CONDUIT WELD POSITIONER WITH ARC LENGTH ADJUSTOR

BACKGROUND OF THE INVENTION

This invention relates in general to a conduit weld positioner and, more particularly, to such a positioner for mounting nonlinear workpieces such as elbows and the like relative to automatic welding equipment.

When tubular sections of workpieces are welded together, it is conventional practice to support the workpiece horizontally on a plurality of roll assemblies and then attach one end of the workpiece to an automatic welding work positioner which rotates the workpiece as the automatic welding operation is effected. This not only facilitates accurate alignment of the sections being welded but also permits the welding operation to be carried out rapidly and conveniently without the necessity of the welder, or welding apparatus, having to move around and underneath the joint being welded.

This technique is very satisfactory for welding straight pipe sections and other linear workpieces but creates problems with nonlinear workpieces, such as elbows, T-members, and other nonlinear welding fittings, since the latter cannot easily be attached to the vertical mounting table of the automatic positioner. Although several techniques have been devised for positioning these nonlinear workpieces to the automatic positioner, these techniques so far are relatively uneconomical, cumbersome, and extremely time consuming.

For example, a supplemental metal member, or plurality of members, is often used to attach the nonlinear fitting to the positioner table. The supplemental member is welded onto the outside surface of the nonlinear fitting and then attached to the mounting table in the normal manner. However, this requires not only the initial welding of the supplemental metal member onto the nonlinear fitting but also requires that the former be cut off the latter after the welding operation has been completed. Quite obviously, this entails a relatively significant expenditure of time, and therefore costs.

SUMMARY OF THE PRESENT INVENTION

It is therefore an object of the present invention to provide a weld positioner which facilitates the attachment of nonlinear welding fittings, such as two conduit portions extending at an angle to each, relative to the vertical turntable of an automatic welding positioner.

It is a still further object of the present invention to provide a weld positioner of the above type which permits nonlinear welding fittings to be quickly and conveniently attached relative to the turntable of the weld positioner without any supplemental welding, cutting or grinding operations.

It is another object of the present invention to provide a weld positioner of the above type which can be used to attach a wide variety of different sizes and shapes of nonlinear welding fittings to the turntable of an automatic positioner.

It is a still further object of the present invention to provide a weld positioner of the above type which can accommodate nonlinear fittings over a relatively wide range of diameters.

It is a still further object of the present invention to provide a weld positioner of the above type which can easily accommodate welded fittings, such as two conduit portions, extending at virtually any angle relative to each other.

It is a still further object of the present invention to provide a weld positioner of the above type in which the adjustments required to accommodate the two conduit portions can be made rapidly and accurately in a simple manner.

Toward the fulfillment of these and other objects, the weld positioner of the present invention includes a turntable adapted to rotate about a central axis along with a frame for grasping one of the conduit portions to be welded. The frame is mounted relative to the turntable in a manner so that the former can be tilted relative to the latter to accommodate variations in the angular relationship between the two conduit members.

BRIEF DESCRIPTION OF THE DRAWINGS

The above brief description, as well as further objects, features and advantages of the present invention will be more fully appreciated by reference to the following detailed description of the presently preferred but nonetheless illustrative embodiment in accordance with the present invention when taken in conjunction with the accompanying drawings in which.

DESCRIPTION OF THE PREFERRED EMBODIMENTS

Figure 1:
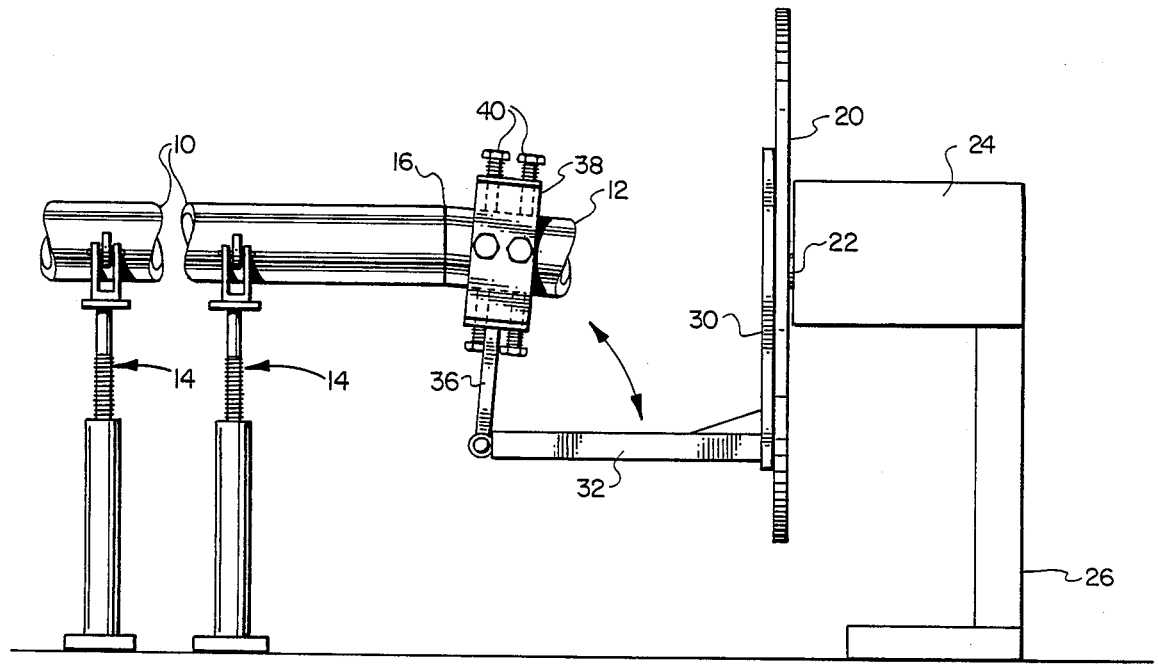
FIG. 1 is a side elevational view of a the weld positioner of the present invention.

Referring to FIG. 1 of the drawings the reference numeral 10 refers in general to a pipe section 10 which is to be welded to a pipe section 12 which extends at an angle thereto. The pipe section 10 is supported in a horizontal position by a pair of spaced roller assemblies 14 of a conventional design and the pipe section 12 is supported by the positioner of the present invention in a manner to be described.

A joint 16 is formed between the two abutting end portions of the pipe sections 10 and 12, and a small initial manual weld is normally made at this joint to enable the two sections to be rotated together in a manner to be described.

The positioner of the present invention includes a rotatable turntable 20 mounted in a vertical plane about a horizontal drive shaft 22 extending from a housing 24 supported by a stand assembly 26. It is understood that a motor and its associated components are provided in the housing 24 to drive the shaft 22 and rotate the turntable 20 at a predetermined constant speed. Since these components are conventional they will not be described in detail.

In normal operations in which two straight pipe sections are to be welded, the end portion of one of the sections is simply fastened to the turntable 20 in a conventional manner so that it extends horizontally and, upon rotation of the turntable, the welding operation between the joints of the sections is achieved in a relatively simple manner.

As mentioned above, the positioner of the present invention is for the purposes of accommodating the two pipe sections 12 and 14 which extend at an angular relation to each other and for this purpose, a plate 30 is fastened to the turntable 20 in any conventional manner and has a pair of support bars 32 cantilevered outwardly therefrom and attached thereto in any conventional manner.

Figure 2:
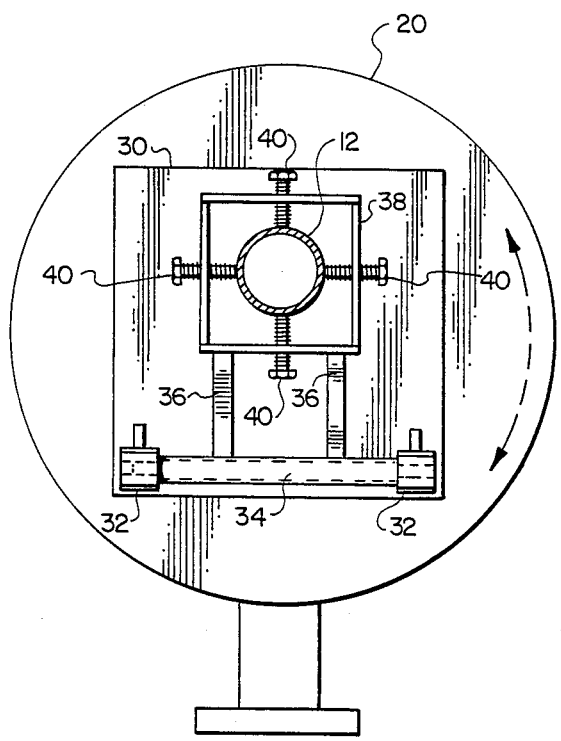
FIG. 2 is a vertical cross-sectional view taken along the line 2—2 of FIG. 1.

As shown in FIG. 2, the support bars 32 are disposed in a spaced relationship and accommodate a rod 34 which is rotatably mounted in corresponding journals formed in the end portions of the support bars. A pair of support members 36 are affixed to, and extend generally upwardly from, the rod 34 and are connected to a frame member.

Four set screws 40 extend through corresponding openings in the frame member 38 and are adapted to engage the conduit section 12 at 90 degree intervals to support the conduit section 12 in a centered relationship in the frame member 38.

As a result of the above, the frame member 38 can be tilted as shown by the solid arrow in FIG. 1 to accommodate the angular offset between the conduit portion 12 and the conduit portion 10.

After the conduit 12 is secured within the frame member 38 and with the latter extending at an angle to the vertical corresponding to the angle between the conduits 10 and 12, the turntable 12 is rotated in either direction as shown by the dashed lines in FIG. 2, resulting in the conduit member 10 rotating about a perfectly horizontal axis to permit the welding equipment, or a welder, to weld the entire joint 16 without having to move around and under the workpiece.

It is thus seen that according to the present invention, the entire welding operation can be carried out in a rapid and safe manner with the apparatus of the present invention being readily adaptable to workpieces of variable sizes and disposed in a variety of angular relationships.

Modifications, changes, and substitutions are intended in the foregoing disclosure and in some instances some features of the invention will be employed without a corresponding use of other features. Accordingly, it is appropriate that the appended claims be construed broadly and in a manner consistent with the spirit and scope of the invention herein.

What is claimed is:

1. A conduit weld positioner for positioning two conduit portions extending at an angle to each other, said positioner comprising a turntable adapted to rotate about a central axis, means for grasping one of said conduit portions, first support means extending from said turntable in a spaced relation to said axis, and second support means connected at one end to said grasping means and at the other end to said first support means for movement between a first position in which the center of said grasping means coincides with said central axis, to a position angularly spaced from said first position to permit tilting of said grasping means relative to said turntable to align said portions in a predeterminted position.

2. The positioner of claim 1 wherein the degree of tilting of said mounting means corresponds to the angular relationship between said conduit portions.

3. The positioner of claim 1 wherein in said predetermined position, the other conduit portion extends horizontally.

4. The positioner of claim 1 wherein said first support means comprises at least one member connected at one end to said turntable and extending perpendicular to said turntable, and wherein said second support means is mounted to the other end of said member.

5. The positioner of claim 4 wherein said first support means further comprises a rod rotatably mounted at said other end of said member and extending at right angles to said member, said second support means being secured to said rod so that said second support means tilts in response to rotation of said rod.

6. The positioner of claim 1 wherein said grasping means comprises a frame member for extending around said one conduit position and set screw means mounted to said frame member for engaging said one conduit portion.

* * * * *